(12) United States Patent
Hélot et al.

(10) Patent No.: US 10,576,824 B2
(45) Date of Patent: Mar. 3, 2020

(54) METHOD FOR CONTROLLING A DISPLAY DEVICE FOR A VEHICLE AND VEHICLE WITH A DISPLAY DEVICE

(71) Applicant: AUDI AG, Ingolstadt (DE)

(72) Inventors: Jacques Hélot, Ingolstadt (DE); Joris Mertens, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 16/322,337

(22) PCT Filed: Jul. 12, 2017

(86) PCT No.: PCT/EP2017/067493
§ 371 (c)(1),
(2) Date: Jan. 31, 2019

(87) PCT Pub. No.: WO2018/024452
PCT Pub. Date: Feb. 8, 2018

(65) Prior Publication Data
US 2019/0168611 A1    Jun. 6, 2019

(30) Foreign Application Priority Data
Aug. 2, 2016  (DE) ........................ 10 2016 214 273

(51) Int. Cl.
*G06F 3/041*    (2006.01)
*G06F 3/045*    (2006.01)
(Continued)

(52) U.S. Cl.
CPC ............ *B60K 35/00* (2013.01); *G06F 3/0488* (2013.01); *G09G 5/373* (2013.01); *G09G 5/38* (2013.01);
(Continued)

(58) Field of Classification Search
CPC ..................................................... B60K 35/00
See application file for complete search history.

(56) References Cited

U.S. PATENT DOCUMENTS

| | | | |
|---|---|---|---|
| 2014/0210757 A1* | 7/2014 | Woo ...................... | G06F 1/1643 345/173 |
| 2015/0077327 A1 | 3/2015 | Pisz et al. | |
| 2016/0176372 A1* | 6/2016 | Kim ........................ | E05F 15/73 701/49 |

FOREIGN PATENT DOCUMENTS

| | | |
|---|---|---|
| DE | 10 2012 019 506 A1 | 4/2014 |
| DE | 10 2012 019 507 A1 | 4/2014 |

(Continued)

OTHER PUBLICATIONS

International Search Report dated May 9, 2018 from International Patent Application No. PCT/EP2017/067493, 6 pages.
(Continued)

*Primary Examiner* — Nan-Ying Yang
(74) *Attorney, Agent, or Firm* — Staas & Halsey LLP

(57) ABSTRACT

A representation of information on a movably mounted display surface is controlled depending on the available space on the display surface. In order to allow an optimal usability of the display surface a portion of the display surface which is hidden from view of a passenger compartment when the display surface moves physically and a remaining, still visible portion of the display surface, are defined. The remaining, still visible portion, defines the available space on the display surface. In addition, depending on the physical movement of the display surface and a consequential accompanying size change of the visible portion, a layout of the representation of the information is changed such that the information is displayed on the visible portion.

17 Claims, 3 Drawing Sheets

(51) Int. Cl.
*B60K 35/00* (2006.01)
*G06F 3/0488* (2013.01)
*G09G 5/373* (2006.01)
*G09G 5/38* (2006.01)

(52) U.S. Cl.
CPC . *B60K 2370/119* (2019.05); *B60K 2370/1438* (2019.05); *B60K 2370/178* (2019.05); *B60K 2370/179* (2019.05); *B60K 2370/182* (2019.05); *B60K 2370/186* (2019.05); *B60K 2370/191* (2019.05); *B60K 2370/195* (2019.05); *B60K 2370/21* (2019.05); *B60K 2370/334* (2019.05); *B60K 2370/52* (2019.05); *B60K 2370/67* (2019.05); *B60K 2370/77* (2019.05); *G09G 2354/00* (2013.01); *G09G 2380/10* (2013.01)

(56) References Cited

FOREIGN PATENT DOCUMENTS

| DE | 10 2014 214 516 A1 | 1/2016 |
|---|---|---|
| DE | 10 2016 214 273.9 | 8/2016 |
| EP | 1 637 386 A1 | 3/2006 |
| EP | 2 883 748 A1 | 6/2015 |
| JP | 55-39843 | 3/1980 |
| JP | 5-104981 | 4/1993 |
| JP | 2010-6092 | 1/2010 |
| WO | 2015/159340 A1 | 10/2015 |
| WO | 2016/093502 A1 | 6/2016 |
| WO | PCT/EP2017/067493 | 7/2017 |

OTHER PUBLICATIONS

Translation of the International Preliminary Report on Patentability dated Feb. 7, 2019 from Patent International Patent Application No. PCT/EP2017/067493, 7 pages.

German Office Action dated Mar. 30, 2019 from German Patent Application No. 10 2016 214 273.9, 8 pages.

Chinese Office Action dated Sep. 4, 2019 from Chinese Patent Application No. 201780048308.5, with English translation of summary of Examiner's comments, 7 pages.

\* cited by examiner

METHOD FOR CONTROLLING A DISPLAY DEVICE FOR A VEHICLE AND VEHICLE WITH A DISPLAY DEVICE

CROSS REFERENCE TO RELATED APPLICATIONS

This application is a U.S. national stage of International Application No. PCT/EP2017/067493, filed on Jul. 12, 2017. The International Application claims the priority benefit of German Application No. 10 2016 214 273.9 filed on Aug. 2, 2016. Both the International Application and the German Application are incorporated by reference herein in their entirety.

BACKGROUND

Described herein is a method for controlling a display apparatus for a vehicle, and a vehicle having such a display apparatus.

The related art already describes various types and forms of display apparatuses having movably mounted display areas. These can be for example displays of navigation and/or multimedia appliances or else different areas—for example a rear of a front seat—that are movable or adjustable on the basis of their further function and are used as projection areas for a representation of image content by use of a projector device. A disadvantage in this case is that to date, despite a certain adjustment flexibility as a result of the respective movable mounting, meaningful and proper use is possible only when the whole display area is completely visible to a respective user, that is to say normally a respective vehicle occupant. As a result, the options for the arrangement of display areas and the use of many areas in the vehicle are distinctly limited.

SUMMARY

Described herein is a method for controlling a display apparatus for a vehicle and a vehicle having such a display apparatus that allow optimum usability of a display area in as many situations as possible.

The method described herein has provision for a controller to be used to control a representation of information on a display area of a display apparatus of the vehicle, which display area is mounted or held movably relative to an interior trim element or component of a vehicle, on the basis of an available size of the display area. A physical movement of the display area, in particular as intended, can result in a first subregion of the display area being concealed from the point of view or perspective of a passenger compartment of the vehicle. A further, remaining subregion of the display area is or remains still visible from the point of view or perspective of the passenger compartment even in the event of, that is to say during and/or after, the movement of the display area. This remaining, still visible subregion of the display area defines or determines the available size of the display area. In other words, the visible subregion is thus the available display area and the size of the visible subregion inherently stipulates the available size of the display area.

The visibility from the point of view or perspective of the passenger compartment in this case means that a respective vehicle occupant can see the further subregion. In particular, the vehicle occupant thus merely needs to direct his eyes at the further, remaining, visible subregion in order to see it and does not need to move the display area or the interior trim element, for example, in order to do so.

The concealment of the first subregion can be provided or effected in particular by an interior trim part of the vehicle, a receiving slot intended for wholly or partially receiving the display area or by a part of the display area itself—for example when the display area can be unrolled or rolled up. The visible subregion can also include all of the display area, in particular in at least one attitude or position of the display area. The method described herein is distinguished in that an arrangement and/or a size of the representation of the information is altered and/or controlled by the controller on the basis of the physical movement and an accompanying size alteration of the visible subregion such that the information is and/or remains presented on the visible subregion of the display area. In other words, dynamic matching or optimization of the information representation is thus effected, so that for example no regions of the display area that are not or would not be visible or usable anyway on account of the concealment are used for the representation.

Advantageously, this allows the display area to be used meaningfully in many or all positions, attitudes or arrangements. By way of example, it advantageously prevents a piece of information, a piece of partial information or an operator control element from not being visible and/or available to the respective user and hence proper or appropriate use of the display apparatus and/or the represented information from not being possible. It is also particularly advantageous that the disclosure allows a dual functionality or dual use of the display area. As such, the mobility, that is to say the movable mounting, holding or arrangement of the display area, can serve a purpose that is totally independent of the presentation of information, for example, and use of this purpose is possible appropriately and without loss of function at the same time as the use as a display area. Furthermore, an energy consumption of the display apparatus can advantageously be optimized by virtue of a concealed subregion of the display area not being used or being shut down, for example.

The control of the arrangement of the representation of the information can also mean control of the arrangement of the information itself, for example within the representation. In general, the control of the arrangement of the representation can take place in a wide variety of ways, which can also be flexibly selected and/or applied, for example depending on the type, form, size and/or content of the representation or of the information. Examples that may be mentioned here are a change, adaptation or optimization of a spatial relationship between different parts, partial information or subregions of the representation and scaling of the representation—fully or only in regions.

The term information is intended to be understood in its broadest form in this case and can cover for example graphical representations, animations or video representations, text or symbol representations, abstract patterns, frames and the like and also any combinations of these that may have been or can be presented or arranged in particular in multiple contiguous or disjunct parts too. Specifically, the presented information can include for example vehicle data, navigation advice and/or multimedia content. In particular, the information can also be in the form of an interface that allows for example interaction or control of functionalities.

Which subregion of the display area is visible in each case can be prescribed or defined by the manufacturer, for example, and coupled to a controller of the movement of the display area or to sensors for recording or monitoring the movement and/or attitude of the display area. Alternatively or additionally, however, there may also be provision for detection, recording or monitoring of an actual field of view or of an actual line of sight of one or more vehicle occupants or users of the display apparatus. It is then possible to dynamically determine which region or subregion of the display area forms the visible subregion in each case.

In a further configuration of the disclosure, there is provision for the information to be presented in a constant position even in the event of, that is to say in particular during and also after, the physical movement of the display area relative to the interior trim element if and while the size of the visible subregion is sufficient for the representation of the information in a prescribed standard size. In other words, the information is moved relative to the display area itself, and hence presented in other parts or subregions of the display area, during the movement of the display area, that is to say continuously. From the point of view of an observer or viewer of the display area who is at a fixed location or position overall relative to the interior trim element or the vehicle, the representation of the information thus remains at the same point while the display area moves. As a result, it is advantageously possible for the respective user or viewer to make out the representation without interference, easily and without difficulty even during or independently of the movement of the display area. It is furthermore advantageous that information—at least while there is sufficient surface area available in the visible subregion—is therefore reliably always displayed at the same point and the respective vehicle occupant can therefore find, recognize or identify the respective information particularly easily and quickly. In this case, there can in particular also be provision for certain specific information or types or categories of information to be displayed at particular different points or positions and/or in particular stipulated spatial relationships relative to one another. By way of example, there can be provision for navigation advice always to be presented below and/or to the right of a multimedia representation or control—at least where possible—even when an arrangement of the representation is altered or adapted by an applicable control. Such positions or arrangements can be prescribed as standard, for example by the manufacturer, or else can be adjustable or adaptable by a respective user.

In a further configuration of the disclosure, there is firstly provision for the representation of the information to be compactified, compressed, condensed or reduced if the size of the visible subregion becomes too small for a representation of the information in a prescribed standard size as a result of the physical movement of the display area. Secondly, there is provision for the representation of the information to be enlarged, expanded and/or dispersed to or to be presented at the prescribed standard size if the size of the visible subregion becomes large enough for a representation of the information in the prescribed standard size as a result of the physical movement of the display area. The prescribed standard size defined or prescribed can be a particular size, type, shape and/or form of representation. In this case too, there are naturally user adjustments or adaptations possible or conceivable—as in the case of all other embodiments or configurations of the disclosure. The condensing can involve there being provision for example for moving individual graphical elements closer together, that is to say decreasing or reducing interspaces. Additionally or alternatively, there can also be provision for the representation to be scaled completely or in regions. These processes are then performed in the opposite manner and direction when the visible subregion is enlarged. As a result, it is advantageously possible for a representation of the information that the respective user can easily make out and that is known or familiar to him to be maintained where and for as long as possible, as a result of which use of the information is facilitated and becomes more convenient.

In a further configuration of the disclosure, there is provision for the information to be presented in a simplified alternative representation, which requires less surface area, if the size of the visible subregion becomes or is too small for a representation of the information in a prescribed standard size and/or type as a result of the physical movement of the display area. In a corresponding opposite manner, the representation of the information changes from the alternative representation or form to the standard size or form as soon as there is sufficient visible surface area or display area available therefor when the visible subregion is enlarged. The alternative representation can have for example a different shape or embodiment of one, multiple or all subregion(s), (piece of) partial information or operator control element(s). A prescribed alternative representation of this kind allows an advantageous option to be created or provided so as—in particular as an alternative to pure scaling of the information to a size that it is no longer possible to make out or use—to ensure that the information is able to be made out and used in an optimum fashion even when the size of the visible subregion of the display area is decreased. The alternative representation can in this case for example provide or render accessible the same information content and/or the same functionalities or operator control elements as are provided in the standard size or form of the representation. In this case, it is also possible for example for multiple pieces of partial information, operator control elements or the like to be presented or rendered accessible in combined fashion, for example as a result of additional nesting, submenus or the like. It is alternatively conceivable for only a subset of the information provided in the standard size or form of the representation to be presented in the alternative representation.

In a further configuration of the disclosure, there is provision for respective partial information in the information presented and/or to be presented to be assigned a respective importance. The respective partial information is then hidden, individually or in grouped succession, contrary to an order of its importance if the visible subregion is reduced below a minimum size as a result of the physical movement of the display area. The respective partial information is shown individually or in groups in an accordingly opposite manner if the visible subregion is enlarged above the minimum size as a result of the physical movement of the display area. The importance of partial information as a criterion can also be understood in the sense of a relevance, for example. The importance or relevance can in this case for example be based on or derived from the remaining partial information presented or to be presented, an order of a respective use or of respective calling or display, and/or of another context. The context can be determined for example by a driving situation or surroundings or a position of the vehicle or the like. The association of an importance and the use of the importance as a criterion for selection of the actually presented piece of partial information or pieces of partial information can advantageously ensure that a delimited surface area or size of the visible subregion is used or utilized in optimum fashion and also as efficiently as possible in terms of content at any time. To hide or show partial information in groups, it is possible for multiple pieces of partial information having the same importance to be combined in or as a group in each case. Similarly, it is additionally or alternatively possible for there to be provision for grouping on the basis of a functionality or a content of the respective partial information. By way of example, in a situation in which a certain piece of partial information is hidden, it is then possible for further information from the same, first group to be hidden first. This can also be prioritized by hiding another piece of partial information from a different, second group that, purely based on the rank or order of importances, would per se be hidden before further partial information from the first group.

In one development of the disclosure, there is provision for the display apparatus and/or the vehicle to include an operator control device for interaction with the presented information, and for the criterion used for stipulating or determining the respective importance of the respective piece of partial information or pieces of partial information to be a respective frequency of interaction. The frequency of interaction can in this case be determined absolutely or relatively with respect to other partial information. For this, there can be provision for a counter, for example, and the applicable counts can be retained or tracked in a buffer store only for a respective duration of a single uninterrupted operating time and/or can be stored in a nonvolatile memory permanently across interruptions to the operation of the display apparatus and/or of the vehicle. Interactions or interaction events can be for example a call, display, operator control or an operator control process for an operator control element or the like. This advantageously results in individually optimized determination or stipulation, matched or attuned to an actual use behavior, of the respective importance and hence it is possible to enable optimally adapted use of the display apparatus and of the information.

In a further configuration of the disclosure, there is provision for the display apparatus and/or the vehicle to include an identification device for identifying and/or recognizing an operator or a user of the display apparatus, and for a respective importance of a respective piece of partial information in the information presented and/or to be presented to be stipulated for each identified operator individually. The identification device used can be for example a camera or an image evaluation device, coupled to a camera, that uses face recognition, for example. Similarly, other biometric features such as, for example, a fingerprint or the like could be recorded, evaluated and used for identification. Alternatively, simple login, for example by input of a password, can be understood as identification for the purposes of the disclosure. In order to enable individual stipulation for each operator, there can be provision for example for a respective profile or user profile to be created for each identified operator in a memory device directly or indirectly coupled to the display apparatus. Such a profile can store applicable statistics, settings and preferences. Alternatively or additionally, there can also be provision for people who are in the vehicle, instead of a personal identification, to be recorded or recognized as people only in principle and for respective movements or changes of position of the person or persons in the vehicle to be followed or tracked (tracking). It is therefore possible for individual adaptation to be realized only for the duration of a journey, for example. This can be particularly advantageous for vehicles that are used by a large number of different people, such as, for example, rental vehicles.

Explicitly, there can also be provision for multiple vehicle occupants to be identified and/or tracked within the vehicle at the same time. Similarly, there can be provision for multiple display apparatuses and/or display areas in the vehicle. Advantageously, a respective association between an identified vehicle occupant and a display area and/or an instance of a representation of information can also be provided for or made. In this manner, it is advantageously possible to ensure that individualized settings—for example for the information presented or to be presented, the arrangement of the information or the like—are presented or displayed in the correct association to precisely the respective vehicle occupant for whom the respective individualization of the representation applies or is intended.

In a comparable or analogous way to what is described for the importance and related settings, the compactification or condensing can also have provision for adaptation, coordination or individualization in regard to a respective operator.

In a further configuration of the disclosure, there is provision for a touch-operated operator control device (e.g. touchscreen or touchpad) on the display area or integrated in the display area, and the physical movement of the display area is controllable by touching an operator control element of the operator control device. As a result, it is advantageously particularly easy for an operator to interact with the presented information by a movement or at one point and to control or adapt the display area or the attitude or position of the display area. Thus, a distinct gain in convenience is attained. On top of that, a separate dedicated operator control element for controlling the attitude of the display area can possibly be dispensed with, which can result in savings in consideration of production effort and a number of components or complexity for the vehicle.

In a further configuration of the disclosure, there is provision for the display area used or exploited to be a windowpane or a windowpane arrangement of the vehicle. For this, it is possible for a, in particular transparent or translucent, screen to be provided for or arranged on or integrated in the windowpane, for example. Such screens can also be touch-operated, that is to say in touch- and/or approach-sensitive form (touchscreen, touchpad). Explicitly, there can also be provision for multiple such screens inside a vehicle or on a vehicle. The windowpanes of vehicles today have been a very largely unexploited surface area resource to date. Their arrangement and function means that they are typically very easy for respective vehicle occupants to see and reach, however. Similarly, windowpanes are in many cases mobile or movable, for example for ventilation purposes. This therefore provides an ideal instance of application for the display apparatus and method described herein.

A vehicle described herein is equipped with a display apparatus described herein and an applicable controller. A display area of the display apparatus, which display area is mounted, held or arranged movably relative to an interior trim or interior element or component, is coupled to the controller directly or indirectly. The controller is in this case configured for controlling a representation of information on the display area on the basis of an available size or surface area of the display area. In order to enable optimum use of the display area in as many situations as possible, the disclosure has provision for the controller to include a processor device and a memory device, wherein the memory device contains or has a program code that is executable by the processor device and that encodes or describes respective method operations, controls and the like of the method described herein. Using the controller specifically configured for this purpose and the display apparatus, one, multiple or all embodiment(s) and variant(s) of the method described herein are thus implementable—where usefully combinable as appropriate. The vehicle described herein can for example be an automobile or a motor vehicle intended for carrying people.

The functional forms and developments of the method that are described above, below and in the claims and the corresponding advantages are accordingly also transferrable, mutatis mutandis, to the vehicle described herein and devices and assemblies used or exploited for performing the method described herein, and vice versa.

BRIEF DESCRIPTION OF THE DRAWINGS

Further details, features and advantages of the disclosure are obtained from the description of example embodiments that follow and taken in conjunction with the accompanying drawings, of which.

DETAILED DESCRIPTION

Figure 1:
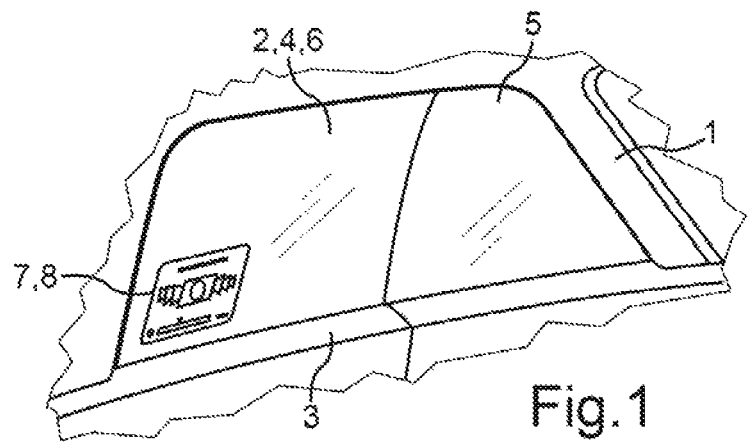
FIG. 1 is a schematic and partial perspective depiction of a region around a side window of a motor vehicle having a display apparatus, the window being closed.

Reference will now be made in detail to examples which are illustrated in the accompanying drawings, wherein like reference numerals refer to like elements throughout.

Devices, assemblies or features that are the same and/or have the same function are provided with the same reference signs in each of the drawings.

FIG. 1 shows a schematic and partial perspective depiction of a lateral region of a motor vehicle 1 having a side window whose windowpane 2 is mobile or movable and in the example case is depicted in a completely closed attitude or position, that is to say in a closed position. The perspective depiction is shown from the point of view of a vehicle interior in this case, which means that an inner side, that is to say a side facing the vehicle interior, of the windowpane 2 can be seen here. The partially shown lateral region can be in a region of a door 3 of the motor vehicle 1, for example. A portion of the door 3 that is arranged below the windowpane 2 in the vertical direction of the vehicle has a receptacle or slot in this case, which receives the windowpane 2 entirely or partially when it is adjusted or moved from the closed position in the direction of an open position in which the windowpane 2 clears a window opening of the window entirely or partially.

In the example case, at least part or regions of the windowpane 2 is/are in the form of or intended as a display area 4, and to this end the windowpane has a transparent and touch-operated screen (touchscreen)—for example based on an OLED (organic light emitting diode) technology. The screen can be applied to a base material of the windowpane 2 or arranged between two layers of the windowpane 2, for example. The display area 4 can extend over the whole windowpane 2. However, it is also conceivable for a window portion 5 not to be included or covered by the display area 4, for example.

In the closed position of the windowpane 2 shown in FIG. 1 in the example case, the whole display area 4 is visible, from the point of view or perspective of the vehicle interior, to a vehicle occupant who is in the vehicle interior. Accordingly, a visible subregion 6 of the display area 4 in this case includes the whole display area 4 completely. A representation 8 of information 7 is displayed or presented on the display area 4—and hence thus in particular on or in the visible subregion 6—in the example case. The size and shape shown here for the representation 8 is meant in this case to be a standard size of the representation 8 that does not need or take up the whole available extent or size of the display area 4 or of the visible subregion 6 in each case either in the vertical direction of the vehicle or in the longitudinal direction of the vehicle in particular. Specifically, the representation 8 in the example case is in a quadrant of both the display area 4 and the visible subregion 6 and also of the window opening that is at the bottom in the vertical direction of the vehicle and the front in the longitudinal direction of the vehicle.

The information 7 can be or include for example an interface, that is to say an interface or user interface having one or more operator control elements. Additionally or alternatively, the information can also include any other content in principle, however. The operator control element in this case can be a particular graphically or artistically denoted region of the representation 8, for example, that triggers a particular function when touched. In the example case, the information 7 can provide information about a currently reproduced media file, for example, and the representation 8 can also include a number of operator control elements for controlling the media reproduction. Individual portions of the information 7 as with individual operator control elements or respective groups or groupings are referred to as partial information 9 in this case (see FIG. 2).

FIG. 2 again shows a schematic and partial perspective depiction of the lateral region of the motor vehicle 1 already shown in FIG. 1, but in this case the window is partially open. The windowpane 2 is thus no longer in the closed position, but rather in an intermediate position between a completely closed and a completely open position. Accordingly, the portion or region of the windowpane 2 and hence also of the display area 4 that is not visible here is thus received or lowered in the receptacle provided for this purpose in the door 3. The visible subregion 6 is accordingly reduced in comparison with the situation depicted in FIG. 1, but according to definition naturally continues to be completely visible from the point of view of the vehicle interior.

Figure 2:
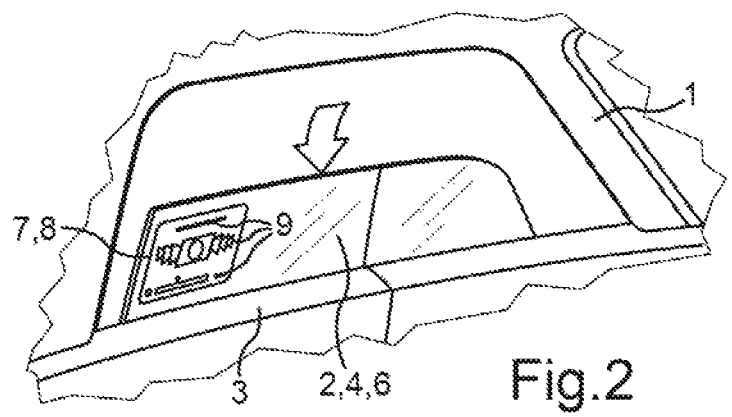
FIG. 2 is a schematic and partial perspective depiction of the region from FIG. 1, the window being partially open.

During the movement of the windowpane 2 from the closed position into the attitude or position shown in FIG. 2, which is indicated by an arrow, there has been a relative movement between the representation 8 and the display area 4, since now the representation 8 is in a quadrant of the windowpane 2 and of the display area 4 that is at the top in the vertical direction of the vehicle but continues to be at the front in the longitudinal direction of the vehicle. From the point of view of the viewing vehicle occupant, on the other hand, the representation 8 has not moved, that is to say that it continues to be arranged in the quadrant of the window opening that is at the bottom in the vertical direction of the vehicle and at the front in the longitudinal direction of the vehicle. Only an applicable limitation for example on the basis of a shape of the windowpane 2 can result in a minimal shift occurring, depending on the embodiment.

In the situation shown in FIG. 2, the representation 8 continues to be depicted in the standard size and all partial information 9 continues to be depicted in the same orientation and arrangement relative to one another. The representation 8 now needs or takes up the whole extent of the visible subregion 6 that is available in the vertical direction of the vehicle, however.

Figure 3:
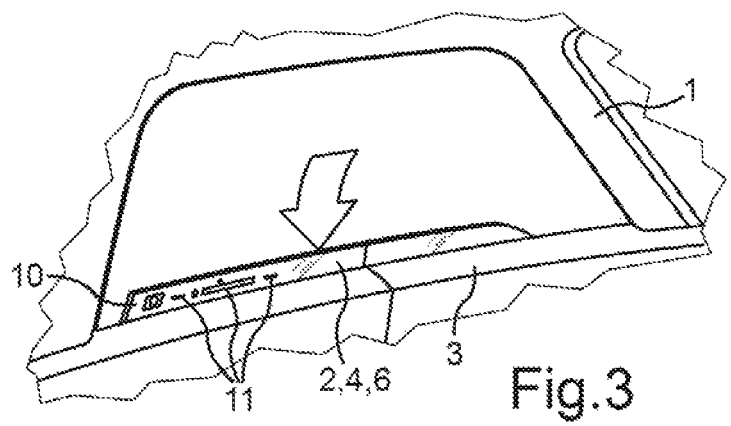
FIG. 3 is a schematic and partial perspective depiction of the region from FIG. 2, the region being open even more.

FIG. 3 again shows a schematic and partial perspective depiction of the lateral region of the motor vehicle 1 that is already shown in FIG. 1 and in FIG. 2, but in this case the window is open even more. The windowpane 2 is thus even closer to its open position than in FIG. 2 and therefore clears more of the window opening. The corresponding movement from the situation depicted in FIG. 2 to the situation depicted in FIG. 3 is indicated by an arrow in this case too. Since, in the almost completely open position of the windowpane 2 shown here, the visible subregion 6 is reduced again and is no longer sufficient to display the representation 8 in the standard size, the previously displayed standard representation is automatically replaced by an alternative representation 10. The alternative representation 10 is an alternative, particularly compact way of presenting at least one subset 11 of the partial information 9 such that every single piece of partial information from the subset 11 be presented at least in a prescribed minimum size. To this end, the full or at least a larger width of the visible subregion 6 in the longitudinal direction of the vehicle is now utilized or used to display the alternative representation 10. In this case, it is thus also possible for relative positions of individual pieces of partial information from the subset 11 to be different in the alternative representation 10 than the relative positions of the corresponding partial information 9 in the representation 8. In terms of function and/or in respect of their abstract information content, the respective partial information can correspond to the applicable variants or alternatives in the representation 8, however.

Scaling of the representation 8, that is to say of the standard representation, to the size of the visible subregion 6 in the situation shown in FIG. 3 that is performed instead would result in the individual pieces of partial information 9 no longer being able to be made out or being distinguishable and/or reliably and specifically usable.

To stipulate the subset 11, that is to say the selection of that partial information 9 that is contained and presented in the alternative representation 10, each of the pieces of partial information has an associated importance. The partial information 9 is then hidden individually or in groups according to its respective or relative importance when the windowpane 2 is adjusted.

Besides the representation 8 and the alternative representation 10, it is also possible for further representations having respectively determined arrangements and/or layouts and subsets of partial information to be provided for or defined that are automatically displayed or adjusted whenever a particular limit value for the size of the visible subregion 6 is undershot or exceeded.

In a corresponding but converse manner, the closing of the window, wherein the windowpane 2 is thus moved from the open position or the attitude shown in FIG. 3 in the direction of the closed position shown in FIG. 1, can automatically result in a change from the alternative representation 10 to the larger and/or more detailed representation 8. For this too, there is provision for the respectively displayed instance of the representation 8 and the alternative representation 10 to be presented in a fixed region from the point of view of the vehicle occupant and for example relative to the door 3—in this case for example in an edge region of the window opening that is at the bottom in the vertical direction of the vehicle. Different information 7 can also have different positions provided for it in this case and the respective representation position can also be alterable or adaptable by the vehicle occupant.

Overall, the information 7 thus advantageously—at any rate insofar as the respective size of the visible subregion 6 so permits—remains visible and if need be usable in at least one form even when the window is open and closed, that is to say in the event of a physical movement of the windowpane 2.

Figure 4:
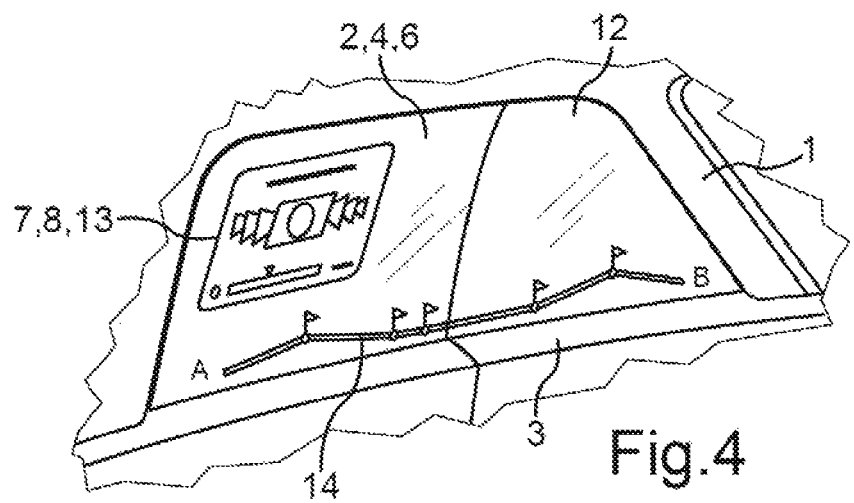
FIG. 4 is a schematic and partial perspective depiction of a region around a side window of a motor vehicle having a display apparatus in an alternative depiction or embodiment, the window being closed.
Figure 5:
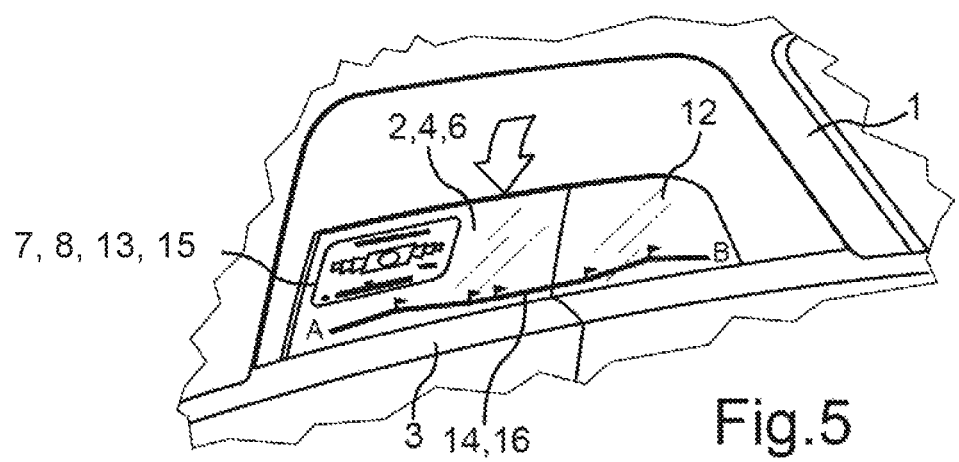
FIG. 5 is a schematic and partial perspective depiction of the region from FIG. 4, the window being partially open.
Figure 6:
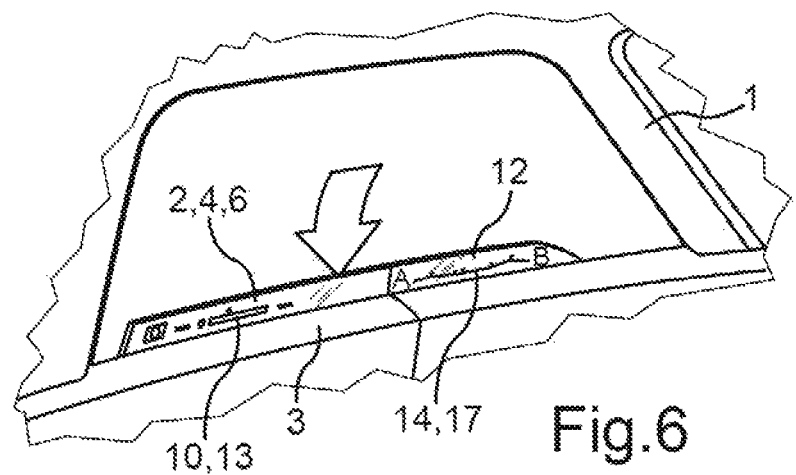
FIG. 6 is a schematic and partial perspective depiction of the region from FIG. 5, the window being open even more.

FIGS. 4, 5 and 6 use a respective schematic and partial perspective depiction to show a sequence of different attitudes of a windowpane 2 in an alternative embodiment, based on the depictions in FIGS. 1, 2 and 3. In this case, the display area 4 actually includes the whole surface area of the windowpane 2, which means that the pane portion 12 corresponding to the pane portion 5 is also intended and configured for display and operator control. In the example case, the information 7 depicted here includes a group or subset 13 and a group or subset 14 of partial information. The subset 13 can correspond to the representation 8, for example, and the subset 14 can be navigation or route information, for example. FIG. 4 shows the subsets 13, 14 in respective standard sizes. To present these, however, they together take up or need—in contrast to the representation 8 alone in FIG. 1—the whole available height and width of the visible subregion 6, both in the vertical direction of the vehicle and in the longitudinal direction of the vehicle, when the window is completely closed, that is to say when the windowpane 2 is arranged in the closed position.

FIG. 5 shows a situation with a partially open window that substantially corresponds to the situation shown in FIG. 3. By contrast, however, in this case the then available visible subregion 6 of the display area 4 is no longer sufficient, right at the beginning or immediately after the beginning of the movement of the windowpane 2 from the closed position depicted in FIG. 4, for displaying the subsets 13 and 14 in the standard size. Accordingly, the attitude of the windowpane 2 shown in FIG. 5 already results in an alternative compact representation 15 of the subset 13 and an alternative compact representation 16 of the subset 14 being displayed.

The compact representation 15 in this case contains all partial information and elements of the subset 13 in the same embodiment or form of representation in each case. The individual pieces of partial information or individual graphical elements are moved closer together in this case, however, so that the whole subset 13 is compactified or condensed. Additionally, there can also be provision for scaling in this case, that is to say a change of size. Such scaling is provided for in this case for the compact representation 16 of the subset 14, for example. The compact representation 16 thus also contains or shows all parts of the subset 14, but takes up less space or surface area in the process.

In the situation shown in FIG. 6 for an—in accordance with the depiction in FIG. 3—almost completely open window, the size of the subregion 6 that is then visible is also no longer sufficient for displaying the compact representations 15, 16. Accordingly, the alternative representation 10 of the subset 13 and an alternative representation 17 of the subset 14 are then also automatically displayed in this case. The alternative representations contain or include for example other symbols and/or only a selection of partial information instead of the full content of the subsets 13, 14 in the respective representation in the standard size or in the respective compact representation 15, 16. In order to make optimum use of the visible subregion 6, the subset 14 in its alternative representation 17 is in this case now presented beside, in the longitudinal direction of the vehicle, instead of below, in the vertical direction of the vehicle, the below the subset 13 and is thus displayed exclusively in the pane portion 12.

Otherwise, the explanations pertaining to FIGS. 1, 2 and 3 can also hold for FIGS. 4, 5 and 6 and/or be transferred to the representations and situations therein.

Figure 7:
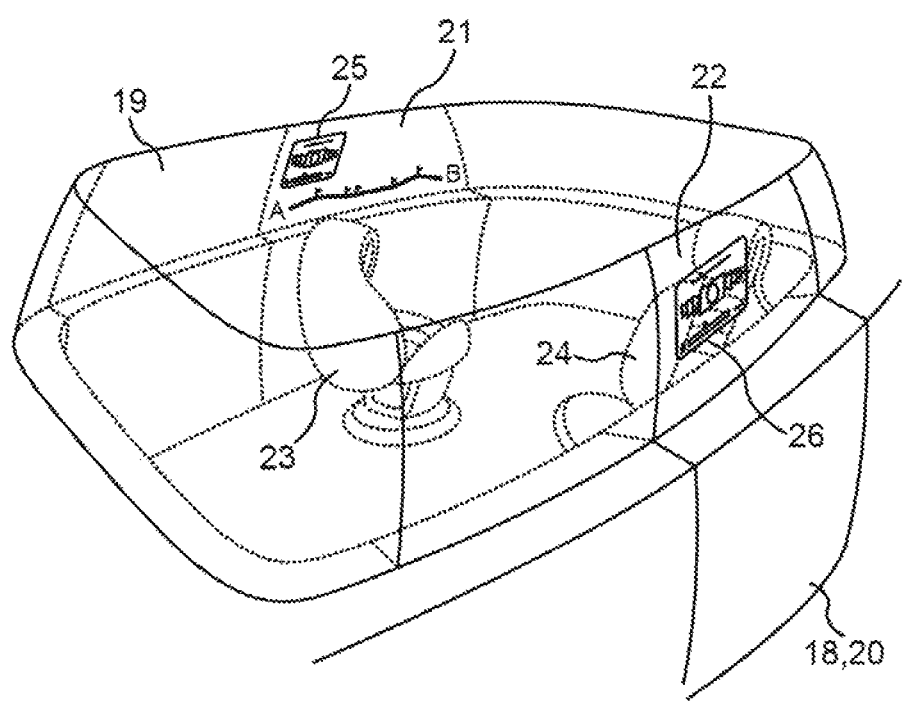
FIG. 7 is a schematic and partial perspective depiction of a piloted motor vehicle having multiple display apparatuses.

FIG. 7 uses a schematic and partial perspective depiction to show a motor vehicle 18. The motor vehicle 18 can in particular be piloted, that is to say configured and designed for autonomous or at least highly automated driving. Such motor vehicles 18 no longer necessarily have to have a dashboard known from motor vehicles, which means that alternative options for presenting information and for operator control, control and interaction are necessary or at least particularly advantageously employable.

The motor vehicle 18 has a circulating windowpane arrangement 19 arranged above a lateral wall 20 of the motor vehicle 18 in the vertical direction of the vehicle. The windowpane arrangement 19 can be divided into multiple portions, one, several or all of which, in a similar manner to that known for vehicle windowpanes, can be entirely or partially lowerable into the lateral wall 20 or receivable in the lateral wall 20. In the example case, at least two pane areas 21, 22 are configured as for the purpose of information presentation or display and, to this end, have transparent screens, for example. Further surface areas of the windowpane arrangement 19 can on be configured in the same manner, however. Furthermore, the motor vehicle 18 in the example case includes a number of seats, of which two seats 23, 24 are depicted by way of example in this case. A respective seat occupant of the seat 23 is able to see the pane area 21 without difficulty and to reach it for operator control purposes, and the same applies to a seat occupant of the seat 24 in respect of the pane area 22.

In the example case, a representation 25 is displayed on the pane area 21 and a representation 26 is displayed on the pane area 22, and the applicable explanations pertaining to the representations 8, 10, 15, 16 and 17 are in particular also intended to apply to the example representations.

The motor vehicle 18 also has an identification device, not depicted in this case, for detecting and identifying vehicle occupants. There is also provision for a memory device, at least indirectly coupled thereto, that is used to store a user profile for an identified vehicle occupant. This user profile can contain settings and preferences for the representations 25, 26 and can be used or taken into consideration for stipulating the importance of individual pieces of partial information and for selecting partial information for a respective alternative representation for the representations 25, 26. Individual adaptation and optimization of the representations 25, 26 for each vehicle occupant is thus possible.

A corresponding identification device can alternatively be provided for in the motor vehicle 1. Overall, the respective details and configurations shown in and/or described in connection with FIGS. 1 to 3 and FIGS. 4 to 6 and FIG. 7 are intended not only to apply to the respective exemplary embodiment but also, where appropriate and technically possible, to be reciprocally transferrable between all embodiments.

A description has been provided with reference to examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. A method for controlling a display apparatus for a vehicle, comprising:
   controlling, by a controller, a representation of information on a display area of the display apparatus based on an available size of the display area, the display area being mounted movably relative to an interior trim element of the vehicle;
   physically moving the display area resulting in a first subregion of the display area being concealed from a point of view of a passenger compartment of the vehicle and a size of a remaining subregion of the display area, which remains visible from the point of view of the passenger compartment, defining the available size of the display area; and
   altering, by the controller, at least one of an arrangement and size of the representation of the information based on the physical movement of the display area and the size of the remaining subregion, and displaying the information on the remaining subregion according to the altered at least one of the arrangement and size of the representation of the information, the altering of the at least one of the arrangement and the size of the representation of the information including:
      assigning pieces of partial information in the information a respective importance based on a context of at least one of a driving situation, a surroundings of the vehicle, or a position of the vehicle,
      hiding the pieces of partial information, individually or in grouped succession, contrary to an order of the importance of the pieces of partial information, when the size of the remaining subregion is reduced below a minimum size as a result of the physical movement of the display area, and
      displaying hidden pieces of partial information according to the order of the importance of the pieces of partial information when the size of the remaining subregion is enlarged above the minimum size as a result of the physical movement of the display area.

2. The method as claimed in claim 1, further comprising displaying the information in a constant position from the point of view of the passenger compartment when the display area is physically moved relative to the interior trim element when the size of the remaining subregion is sufficient for the representation of the information to be displayed in a prescribed standard size.

3. The method as claimed in claim 1, further comprising:
   displaying the representation of the information in a compact form when the size of the remaining subregion decreases as a result of the physical movement of the display area and is too small for the representation of the information to be displayed in a prescribed standard size; and
   enlarging the representation of the information from the compact form to the prescribed standard size when the size of the remaining subregion increases as a result of the physical movement of the display area and is large enough for the representation of the information to be displayed in the prescribed standard size.

4. The method as claimed in claim 1, further comprising displaying the information in a simplified alternative representation, which requires less surface area of the display area, when the size of the remaining subregion decreases as a result of the physical movement of the display area and is too small for the representation of the information to be displayed in a prescribed standard size.

5. A method for controlling a display apparatus for a vehicle, comprising:
receiving an input via an operator control device of at least one of the display apparatus and the vehicle to interact with information displayed on a display area of the display apparatus;
controlling, by a controller, a representation of the information displayed on the display area of the display apparatus based on an available size of the display area, the display area being mounted movably relative to an interior trim element of the vehicle;
physically moving the display area resulting in a first subregion of the display area being concealed from a point of view of a passenger compartment of the vehicle and a size of a remaining subregion of the display area, which remains visible from the point of view of the passenger compartment, defining the available size of the display area; and
altering, by the controller, at least one of an arrangement and size of the representation of the information based on the physical movement of the display area and the size of the remaining subregion, and displaying the information on the remaining subregion according to the altered at least one of the arrangement and size of the representation of the information, the altering of the at least one of the arrangement and the size of the representation of the information including:
assigning pieces of partial information in the information a respective importance based on a respective frequency of interaction via the operator control device,
hiding the pieces of partial information, individually or in grouped succession, contrary to an order of the importance of the pieces of partial information, when the size of the remaining subregion is reduced below a minimum size as a result of the physical movement of the display area, and
displaying hidden pieces of partial information according to the order of the importance of the pieces of partial information when the size of the remaining subregion is enlarged above the minimum size as a result of the physical movement of the display area.

6. The method as claimed in claim 1, further comprising:
identifying an operator using an identification device of at least one of the display apparatus and the vehicle, and
assigning the pieces of partial information the respective importance is based on the identification of the operator.

7. The method as claimed in claim 1, further comprising controlling the physical movement of the display area via a touch input to an operator control element of a touch-operated operator control device provided on the display area or integrated in the display area.

8. The method as claimed in claim 1, wherein the display area is a windowpane of the vehicle.

9. A vehicle, comprising:
a passenger compartment;
an interior trim element;
a display apparatus which includes a display area mounted movably relative to the interior trim element such that when the display area is physically moved a first subregion of the display area is concealed from a point of view of the passenger compartment and a remaining subregion of the display area remains visible from the point of view of the passenger compartment, a size of the remaining subregion defining an available size of the display area; and
a controller, coupled to the display apparatus, configured to control a representation of information on the display area based on the available size of the display area, the controller including a processor and a memory to store a program code, the processor being configured to execute the program code stored in the memory to:
alter at least one of an arrangement and size of the representation of the information based on the physical movement of the display area and the size of the remaining subregion based on a respective importance assigned to pieces of partial information in the information based on a context of at least one of a driving situation, a surroundings of the vehicle, or a position of the vehicle, and
control the display apparatus to display the information on the remaining subregion according to the altered at least one of the arrangement and size of the representation of the information by:
controlling the display apparatus to hide the pieces of partial information, individually or in grouped succession, contrary to an order of the importance of the pieces of partial information, when the size of the remaining subregion is reduced below a minimum size as a result of the physical movement of the display area, and
controlling the display apparatus to display hidden pieces of partial information according to the order of the importance of the pieces of partial information when the size of the remaining subregion is enlarged above the minimum size as a result of the physical movement of the display area.

10. The vehicle as claimed in claim 9, wherein the processor is configured to execute the program code to control the display apparatus to display the information in a constant position from the point of view of the passenger compartment when the display area is physically moved relative to the interior trim element when the size of the remaining subregion is sufficient for the representation of the information to be displayed in a prescribed standard size.

11. The vehicle as claimed in claim 9, wherein the processor is configured to execute the program code to control the display apparatus to:
display the representation of the information in a compact form when the size of the remaining subregion decreases as a result of the physical movement of the display area and is too small for the representation of the information to be displayed in a prescribed standard size; and
enlarge the representation of the information from the compact form to the prescribed standard size when the size of the remaining subregion increases as a result of the physical movement of the display area and is large enough for the representation of the information to be displayed in the prescribed standard size.

12. The vehicle as claimed in claim 9, wherein the processor is configured to execute the program code to control the display apparatus to display the information in a simplified alternative representation, which requires less surface area of the display area, when the size of the remaining subregion decreases as a result of the physical movement of the display area and is too small for the representation of the information to be displayed in a prescribed standard size.

13. A vehicle, comprising:
a passenger compartment;
an interior trim element;
a display apparatus which includes a display area mounted movably relative to the interior trim element such that when the display area is physically moved a first subregion of the display area is concealed from a point of view of the passenger compartment and a remaining subregion of the display area remains visible from the point of view of the passenger compartment, a size of the remaining subregion defining an available size of the display area;
an operator control device configured to receive an input to interact with information displayed on the display area of the display apparatus; and
a controller, coupled to the display apparatus, configured to control a representation of the information displayed on the display area based on the available size of the display area, the controller including a processor and a memory to store a program code, the processor being configured to execute the program code stored in the memory to:
 assign a respective importance to pieces of partial information in the information based on a respective frequency of interaction via the operator control device,
 alter at least one of an arrangement and size of the representation of the information based on the physical movement of the display area and the size of the remaining subregion based on the respective importance assigned to the pieces of partial information in the information, and
 control the display apparatus to display the information on the remaining subregion according to the altered at least one of the arrangement and size of the representation of the information by:
  controlling the display apparatus to hide the pieces of partial information, individually or in grouped succession, contrary to an order of the importance of the pieces of partial information, when the size of the remaining subregion is reduced below a minimum size as a result of the physical movement of the display area, and
  controlling the display apparatus to display hidden pieces of partial information according to the order of the importance of the pieces of partial information when the size of the remaining subregion is enlarged above the minimum size as a result of the physical movement of the display area.

14. The vehicle as claimed in claim 9, further comprising:
an identification device configured to identify an operator, and
the processor is configured to execute the program code to assign the respective importance to the pieces of partial information based on the identification of the operator.

15. The vehicle as claimed in claim 9, further comprising a touch-operated operator control device having an operator control element, provided on the display area or integrated in the display area, configured to control the physical movement of the display area via a touch input.

16. The vehicle as claimed in claim 9, further comprising a windowpane, and
the windowpane is the display area.

17. The vehicle as claimed in claim 9, the altering of the at least one of the arrangement and the size of the representation of the information further includes utilizing an increased width of the visible subregion in a longitudinal direction of the vehicle.

\* \* \* \* \*